Nov. 24, 1964 J. W. McPHERSON 3,158,800

VARIABLE-IMPEDANCE ELECTRIC CIRCUITS

Filed Aug. 26, 1960 2 Sheets-Sheet 1

INVENTOR

JOHN WEMYSS McPHERSON

BY Kirschstein, Kirschstein + Ottinger

ATTORNEYS

Nov. 24, 1964 J. W. McPHERSON 3,158,800

VARIABLE-IMPEDANCE ELECTRIC CIRCUITS

Filed Aug. 26, 1960 2 Sheets-Sheet 2

INVENTOR
JOHN WEMYSS McPHERSON
BY Kurschtein, Kurschtein & Ottinger
ATTORNEYS 3,158,800
Patented Nov. 24, 1964

3,158,800

VARIABLE-IMPEDANCE ELECTRIC CIRCUITS

John Wemyss McPherson, Hayes, England, assignor to The General Electric Company Limited, London, England Filed Aug. 26, 1960, Ser. No. 52,238
Claims priority, application Great Britain, Aug. 28, 1959, 29,539/59
8 Claims. (Cl. 323—22)

This invention relates to variable-impedance electric circuits.

It is an object of the present invention to provide an improved variable-impedance electric circuit which may be used, for example, as the series impedance element of a direct current voltage stabilizer circuit.

According to the present invention, a variable-impedance electric circuit comprises a first terminal, a second terminal, first and second transistors each having a control electrode and two further electrodes, a non-linear resistance element, a linear resistance, the first terminal being connected to one of said further electrodes of the first transistor the other further electrode of which is connected by way of said non-linear resistance element to the second terminal, the first terminal also being connected by way of said linear resistance to one of said further electrodes of the second transistor the other further electrode of which is connected to the second terminal, a direct connection between the further electrode of the first transistor adjacent said non-linear resistance element and the control electrode of the second transistor, and a path connected to the control electrode of the first transistor over which a control bias may be supplied to said control electrode, the arrangement being such that the impedance of the circuit, measured between the first and second terminals, may be varied by varying the value of said control bias.

Three variable-impedance electric circuits in accordance with the present invention will now be described by way of example with reference to the accompanying drawings. A direct current voltage stabilizer circuit which includes one of the variable-impedance circuits will also be described, such a voltage stabilizer circuit being illustrative of the use to which the variable-impedance circuits may be put.

Figure 1:
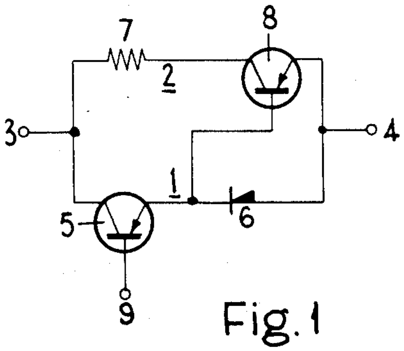
Figure 2:
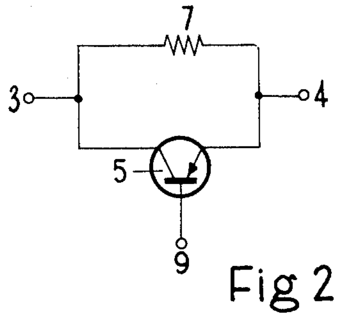
Figure 3:
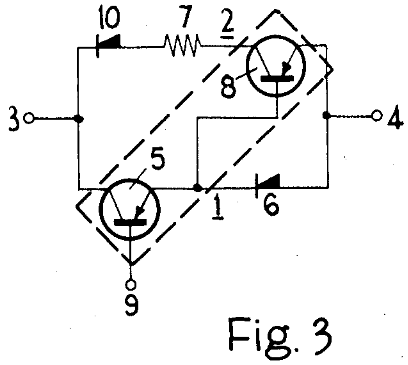
Figure 4:
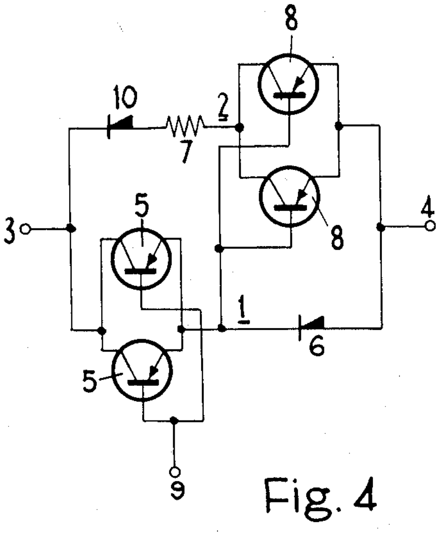
Figure 5:
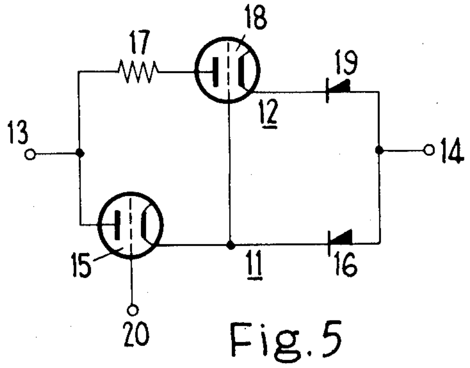
Figure 6:
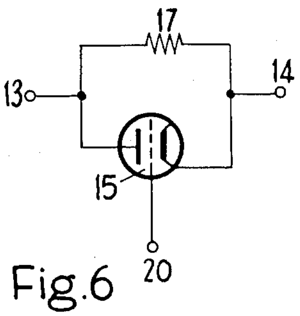
Figure 7:
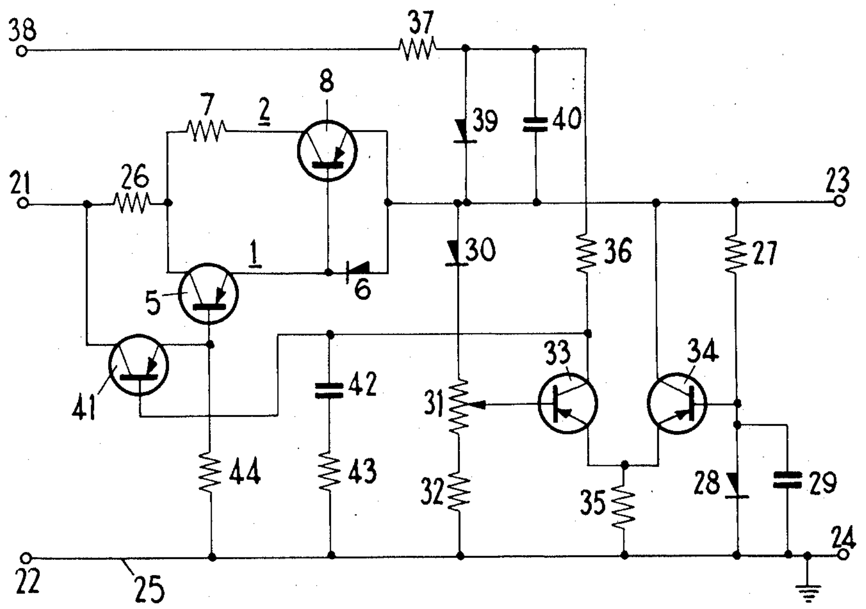

In the accompanying drawings:

FIGURE 1 shows the first variable-impedance circuit,

FIGURE 2 shows a simplified circuit, used in explaining the operation of the circuit of FIGURE 1, FIGURE 3 shows the second variable-impedance circuit, FIGURE 4 shows a development of the circuit of FIGURE 3, FIGURE 5 shows the third variable-impedance circuit, FIGURE 6 shows a simplified circuit used in explaining the operation of the circuit of FIGURE 5, and FIGURE 7 shows the circuit of FIGURE 1 incorporated in a voltage stabilizer circuit.

Referring now to FIGURE 1 of the drawings, the first circuit to be described comprises two paths 1 and 2 connected in parallel between an input terminal 3 and an output terminal 4. In the path 1 the terminal 3 is connected to the collector electrode of a junction transistor 5, having collector, emitter and base electrodes, the emitter electrode of the transistor 5 being connected to one terminal of a rectifier element 6, the other terminal of which is connected to the terminal 4. In the path 2 the terminal 3 is connected to one terminal of a resistor 7, the other terminal of which is connected to the collector electrode of a junction transistor 8, having collector, emitter and base electrodes, the emitter electrode of the transistor 8 being connected to the terminal 4.

A connection is made between the emitter electrode of the transistor 5 and the base electrode of the transistor 8, and a further connection is made from a terminal 9 to the base electrode of the transistor 5, whereby a suitable control bias may be applied to that electrode.

The method of selecting the value of the resistor 7 for optimum operation of the circuit will be understood from the following consideration, for which reference is first made to FIGURE 2 of the drawings. Suppose first that the circuit of FIGURE 1 merely comprised the transistor 5 with its collector and emitter electrodes connected to the terminals 3 and 4 respectively. Then, if I is the maximum current flowing from the terminal 3 to the terminal 4, and W is the maximum power which can safely be dissipated in the transistor 5, the maximum voltage $V_1$ which can be dropped between the terminals 3 and 4 is given by:

$$V_1=\frac{W}{I} \qquad (1)$$

If now a resistor (the resistor 7) of value R is connected in parallel with the collector-emitter path of the transistor 5, then it will be appreciated that the power dissipated in the transistor 5 will be a maximum when the impedance of the transistor 5 is equal to R. When this is so, the current flowing in the collector-emitter path of the transistor 5 is I/2.

The maximum permissible dissipation of power W in the transistor 5 therefore occurs when the voltage drop across the transistor 5 is 2W/I, the impedance between the terminals 3 and 4 then having half its maximum value. When this is so, the impedance (R) of the transistor 5 is given by:

$$R=\frac{2W}{I}\times\frac{2}{I} \qquad (2)$$

so that R should be approximately equal to $4W/I^2$.

The maximum voltage $V_2$ which can now be dropped between the terminals 3 and 4 (which will occur when the transistor 5 has a high impedance and passes substantially no current) is given by:

$$V_2=\frac{4W}{I^2}\times I$$

that is:

$$V_2=\frac{4W}{I} \qquad (3)$$

Comparing Expressions 1 and 3, it will be seen that the maximum permissible voltage drop is increased fourfold by the inclusion of the resistor 7. That is to say, for a given voltage drop between the terminals 3 and 4, the transistor 5 is required to have only one quarter of the power handling capacity of the circuit as a whole. When the circuit of FIGURE 2 is operating at its maximum power handling capacity, most of the remaining power, not dissipated in the transistor 5, is dissipated in the resistor 7 which can, of course, be made less susceptible to damage caused by rises in temperature than a transistor.

(It should be noted that the use of two similar transistors in parallel would only increase the maximum permissible voltage drop by a factor of 2.)

In the foregoing treatment, it has been assumed that the current flowing between the terminals 3 and 4 is substantially constant. If the circuit is to form the series impedance of a direct current voltage stabilizer circuit, for example, it is desirable that the impedance measured between the terminals 3 and 4, should continue to vary in the required manner even when the current taken by the load is reduced, in order that the output voltage may remain substantially constant. In such a case, therefore, the circuit of FIGURE 1 may be employed, and the operation of this circuit will now be considered.

If the transistor 8 is bottomed, then the circuit of FIGURE 1 is, in effect, merely the transistor 5 with the resistor 7 in parallel with its collector-emitter path, that is the circuit shown in FIGURE 2, which was discussed above. In this case, therefore, the maximum power dissipated in the transistor 5 is given by:

$$\frac{V_2 I}{4}$$

Thus, if the voltage remains constant at a value $V_2$, the power dissipated in the transistor 5 will not exceed W so long as the current through the transistor 5 does not exceed $I/4$. If the transistor 8 is not bottomed, therefore, but has high resistance for values of current of less than $I/4$ flowing in the collector-emitter path of the transistor 5, the required control can be maintained by the transistor 5 alone. To give the full range of control, the rectifier element 6 in the first path is chosen so that the transistor 8 is bottomed by the time the current flowing in the transistor 5 reaches a value not greater than $I/4$.

The circuit shown in FIGURE 1 is such that if a current I is flowing between the terminals 3 and 4 when the voltage drop between the terminals 3 and 4 has a comparatively low value, the transistor 5 will be bottomed, so that most of the current flows in the path 1. If the rectifier element 6 were replaced by a linear resistor, there would be a comparatively large voltage drop across it, and this would cause a large base current to flow into the transistor 8 which might, in consequence, be endangered. This is avoided by using the rectifier 6 which is arranged so that its forward direction of current flow is away from the terminal 4.

A typical arrangement of the circuit of FIGURE 1 is as follows:

Resistor 7, 1.35 ohms.
Transistors 5 and 8; type GET 572 as supplied by The General Electric Company Limited.
Rectifier element 6; type SX 751 as supplied by The General Electric Company Limited.

Referring now to FIGURE 3 of the drawings, this shows a circuit which is similar to the circuit of FIGURE 1 with the addition of a rectifier element 10. Apart from the rectifier element 10 the circuit of FIGURE 3 is the same as that of FIGURE 1 and the components are therefore designated by the same reference numerals.

Referring again to the circuit of FIGURE 1 for the moment, it was mentioned that it is necessary to provide the rectifier element 6 to avoid endangering the transistor 8. The inclusion of the rectifier element 6 does, however, alter the value of the maximum power dissipated in the transistor 5 by reducing the voltage drop across the transistor 5, the previous maximum voltage ($V_2$) being reduced to $V_2-V_3$, where $V_3$ is the voltage drop across the rectifier element 6. The power dissipated in the transistor 5 is a maximum when the impedance of the transistor 5 is equal to R and the current flowing in its collector-emitter path is equal to $I/2$, the voltage drop between the terminals 3 and 4 then being $V_2/2$. The maximum power dissipated in the transistor 5, with the circuit arrangement of FIGURE 1, will therefore be approximately equal to:

$$\frac{\left[\frac{V_2-V_3}{2}\right]^2}{R}$$

that is:

$$\frac{(V_2-V_3)^2}{4R}$$

and this is clearly less than $$\frac{V_2^2}{4R}$$

(which was previously the maximum power dissipated in the transistor 5 and which from Expressions 2 and 3 is equal to W).

As $V_3$ may be as much as 1 volt this will, in many applications, represent an appreciable percentage of the maximum voltage drop $V_2$ between the terminals 3 and 4. If, for example, the circuit of FIGURE 1 is used as the series impedance element of a direct current voltage stabilizer circuit, the control range of the voltage stabilizer circuit will, in fact, be reduced by this amount. It would appear that the full control range could be restored by increasing the value of $V_2$ by an amount $V_3$ but this is not, in practice, possible, because the presence of the rectifier element 6 does not affect the condition for maximum power dissipation in the transistor 8. This occurs when the resistance of the transistor 8 is equal to R, the transistor 5 is passing only a small current, and the voltage between the terminals 3 and 4 is equal to $V_2$. The power dissipation in the transistor 8 is, under these conditions:

$$\frac{V_2^2}{4R}$$

that is to say, is equal to W, the maximum possible.

For this reason it may in some circumstances be preferable to use the circuit shown in FIGURE 3 in which the rectifier element 10 is added to the circuit of FIGURE 1 in the path 2 to reduce the voltage drop across the transistor 8 and, therefore, the maximum power dissipitated in the transistor 8. When this is done the value of $V_2$ may be increased by an amount $V_3$, as previously suggested, and the full range of control substantially restored.

A typical arrangement of the circuit of FIGURE 3 is as follows:

Resistor 7, 1.00 ohm.
Transistors 5 and 8; type GET 573 as supplied by The General Electric Company Limited.
Rectifier elements 6 and 10; type SX 751 as supplied by The General Electric Company Limited.

If the circuit of FIGURE 3 is used as the series impedance element of a direct current voltage stabilizer circuit, which is required to pass 0 to 8 amps at an output voltage of 21 volts, the input voltage fluctuating between 22 and 29 volts, then the maximum power dissipated in the circuit is 64 watts. In typical conditions of ambient temperature and with a typical value of thermal resistance of the heat sink on which the transistors 5 and 8 are mounted, the maximum power which can be dissipated in each of the transistors 5 and 8 is 16 watts and, with the circuit arrangement described above, this value is not exceeded for either of the transistors 5 or 8 at any time.

Consideration of the conditions, previously set out, under which the transistors 5 and 8 are dissipating maximum power, shows that the conditions are not the same for each of the transistors 5 and 8. As a result it is possible to mount both the transistors 5 and 8 on the same heat sink, indicated diagrammatically in FIGURE 3 by the broken rectangle, the sink being dimensioned so that the maximum rate at which it can absorb heat from the transistors 5 and 8 is approximately equal to the rate at which one of the transistors 5 and 8 generates heat when the power being dissipated in that transistor 5 or 8 is equal to W. This, of course, results in a considerable saving in space.

It will be appreciated that the circuits of FIGURES 1 and 3 have the characteristics of a transistor having four times the power handling capacity of the transistor 5. The power handling capacity of the circuits may be increased still further by substituting for each of the transistors 5 and 8 a plurality of transistors connected with their collector-emitter paths in parallel and their base electrodes commoned.

An example of this is shown in FIGURE 4 of the drawings which shows a development of the circuit of FIGURE 3, including two transistors 5 and two transistors 8. The power handling capacity of the circuit of FIGURE 4 is, therefore, twice that of the circuit of FIGURE 3.

Referring now to FIGURE 5 of the drawings, the third circuit comprises two paths 11 and 12 connected in parallel between an input terminal 13 and an output terminal 14. In the path 11 the terminal 13 is connected to the anode of a triode thermionic valve 15, the cathode of which is connected to one terminal of a rectifier element 16, the other terminal of which is connected to the terminal 14. In the path 12 the terminal 13 is connected to one terminal of a resistor 17, the other terminal of which is connected to an anode of a triode thermionic valve 18, the cathode of which is connected to one terminal of a rectifier element 19, the other terminal of which is connected to the terminal 14.

A connection is made between the cathode of the triode 15 and the control grid of the triode 18, and a further connection is made from a terminal 20 to the control grid of the triode 15 whereby a suitable control bias may be applied to that grid.

The method of selecting the value of the resistor 17 for optimum operation of the circuit will be understood from the following consideration, for which reference is made to FIGURE 6 of the drawings. Suppose first that the circuit of FIGURE 5 merely comprised the triode 15 with its anode and cathode connected to the terminals 13 and 14 respectively. Then if $i$ is the maximum current flowing from the terminal 13 to the terminal 14 and $w$ is the maximum power which can safely be dissipated in the triode 15, the maximum voltage $v_1$ which can be dropped between the terminals 13 and 14 is given by:

$$v_1=\frac{w}{i} \qquad (4)$$

If now a resistor (the resistor 17) of value $r$ is connected in parallel with the anode-cathode path of the triode 15, then it will be appreciated that the power dissipated in the triode 15 will be a maximum when the resistance of the triode 15 is equal to $r$. When this is so, the current flowing in the anode-cathode path of the triode 15 is $i/2$.

The maximum permissible dissipation of power $w$ in the triode 15 therefore occurs when the voltage drop across the triode 15 is $2w/i$, the impedance between the terminals 13 and 14 of the circuit then being half its maximum value. When this is so, the resistance ($r$) of the triode 15 is given by:

$$\frac{2w}{i}\times\frac{2}{i}$$

so that $r$ should be approximately equal to $4w/i^2$. The maximum voltage $v_2$ which can now be dropped between the terminals 13 and 14 (which will occur when the triode 15 has a high resistance and passes no current) is given by:

$$v_2=\frac{4w}{i^2}\times i$$

that is:

$$v_2=\frac{4w}{i} \qquad (5)$$

Comparing Expressions 4 and 5 it will be seen that the maximum permissible voltage drop is increased fourfold by the inclusion of the resistor 17. That is to say, for a given voltage drop between the terminals 13 and 14, the triode 15 is required to have only one-quarter of the power handling capacity of the circuit as a whole. When the circuit of FIGURE 6 is operating at its maximum power handling capacity, most of the remaining power, not dissipated in the triode 15, is dissipated in the resistor 17.

(It may be noted that the use of two similar triodes in parallel would only increase the maximum permissible voltage drop by a factor of 2.)

In the foregoing treatment, it has been assumed that the current flowing between the terminals 13 and 14 is substantially constant. If the circuit is to form the series impedance element of a direct current voltage stabilizer circuit, for example, it is desirable that the impedance measured between the terminals 13 and 14, should continue to vary in the required manner even when the current taken by the load is reduced, in order that the output voltage may remain substantially constant. In such a case, therefore, the circuit of FIGURE 5 is employed, and the operation of this circuit will now be considered.

If the triode is conducting with negligible voltage drop between anode and cathode, then the circuit of FIGURE 5 is, in effect, merely the triode 15 with the resistor 17 in parallel with its anode-cathode path, which is the arrangement discussed with reference to FIGURE 6. However, the triode 18 has an appreciable resistance even when it is conducting and it is necessary to consider this resistance of the triode 18 as a part of the value of the resistor 17. The value $r$ of the resistor 17 should, therefore, be approximately equal to:

$$\frac{4w}{i^2}-r_a$$

where $r_a$ is the minimum value of resistance which the triode 18 assumes during operation of the circuit.

In this case, therefore, the power dissipated in the triode 15 is given by:

$$\frac{v_2 i}{4}$$

Thus, if the voltage remains constant at a value $v_2$, the power dissipated in the triode 15 will not exceed $w$ so long as the current through the triode 15 does not exceed $i/4$. If the triode 18 is not conducting, therefore, but has a high resistance for value of current less than $i/4$ flowing in the anode-cathode path of the triode 15, the required control can be maintained by the triode 15 alone. To give a full range of control the rectifier element 16 is chosen so that the triode 18 is fully conducting by the time the current flowing in the triode 15 reaches a value not greater than $i/4$.

The rectifier elements 16 and 19 may be Zener diodes, each arranged with their forward directions of conductivity of current away from the terminal 14. Since, in operation of the circuit of FIGURE 5, a positive potential is applied to the terminal 13, the Zener diodes 16 and 19, when conducting, will be conducting in their reverse directions.

If then a bias is applied to the control grid of the triode 15 so as to cause it to conduct, the reverse breakdown voltage of the Zener diode 16 is exceeded and a current flows in the path 11. There will, however, be a voltage drop across the Zener diode 16 due to its voltage/current characteristic and this will cause the control grid of the triode 18 to be biassed so that the triode 18 tends to conduct.

The voltage operating between the control grid and the cathode of the triode 18 will be the algebraic sum of the voltages appearing across the Zener diodes 16 and 19. For any value of current flowing through the triode 18 the voltage across the Zener diode 19 will approximate to the Zener or limiting voltage of the Zener diode 19. This is arranged to be of such a value that, for the maximum voltage appearing between the terminals 13 and 14, this Zener voltage approximates to the value required in the grid-cathode circuit of the triode 18 to cut-off the current flowing in the triode 18.

The current flowing in the path 11 will cause a voltage to be generated across the Zener diode 16 as previously explained, and this voltage acts in opposition to the voltage appearing across the Zener diode 19, so that the net voltage appearing between the control grid and the cathode of the triode 18 may be varied between the limiting values necessary to make the triode 18 appear as a very high or a comparatively low resistance as required.

A typical arrangement of the circuit of FIGURE 5 is as follows:

Resistor 17, 1,830 *ohms.*
Triodes 15 and 18; type A 2134 as supplied by The General Electric Company Limited.

The Zener diodes 16 and 19 each have a reverse breakdown voltage of 60 volts and they are capable of carrying a current of 120 milliampers.

The circuit of FIGURE 5 will support voltages of approximately 180 volts up to 460 volts when passing any current up to 120 milliamperes.

It will be appreciated that the circuit of FIGURE 5 has the characteristics of a triode thermionic valve having approximately four times the power handling capacity of the triode 15, and it is particularly advantageous for use with thermionic valves satisfying the criterion:

$$v_{max} i_{max} \geq 4 p_{max}$$

where
$v_{max}$ is the maximum permissible anode-cathode voltage of the thermionic valves,
$i_{max}$ is the maximum permissible anode to cathode current of the thermionic valves, and
$p_{max}$ is the maximum permissible anode dissipation of the thermionic valves.

The circuit of FIGUE 5 may, of course, be adapted for use with thermionic valves other than triodes, for example, pentodes.

Referring now to FIGURE 7 of the drawings, this shows an example of one use of the variables-impedance circuits described above. The particular circuit used is that of FIGURE 1 and it is used as the series impedance element of a direct current voltage stabilizer circuit.

The voltage stabilizer circuit has two input terminals 21 and 22, and two output terminals 23 and 24, the terminals 22 and 24 being connected together by an earth line 25. The terminal 21 is connected by way of a resistor 26 to the series impedance element, which is similar to the circuit of FIGURE 1 and the components of which are therefore designated by the same reference numerals. The output side of the series impedance element is connected to the terminal 23.

The terminal 23 is connected to the earth line 25 by way of a path comprising a resistor 27 and a Zener diode 28 in series. The Zener diode 28 is shunted by a capacitor 29. The terminal 23 is also connected to the earth line 25 by way of another path comprising a Zener diode 30 and resistors 31 and 32 in series.

A variable tapping point on the resistor 31 is connected to the base electrode of a junction transistor 33, having collector, emitter and base electrodes, the transistor 33 being arranged in common emitter configuration with a similar transistor 34. The emitter electrodes of the transistors 33 and 34 are both connected by way of a resistor 35 to the earth line 25. The collector electrode of the transistor 34 is connected to the terminal 23, whilst the collector electrode of the transistor 33 is connected by way of resistors 36 and 37 in series to a further terminal 38.

The junction of the resistors 36 and 37 is connected to the terminal 23 by way of a Zener diode 39 and a capacitor 40 in parallel.

The collector electrode of the transistor 33 is also connected to the base electrode of a junction transistor 41, having collector, emitter and base electrodes, and to the earth line 25 by way of a capacitor 42 and a resistor 43 in series.

The collector electrode of the transistor 41 is connected to the terminal 21, and its emitter electrode is connected to the base electrode of the transistor 5 and by way of the resistor 44 to the earth line 25.

In operation of the voltage stabilizer circuit, the terminals 21 and 22 are connected to the negative and positive poles respectively of a direct current source. The voltage of the source varies between 11.7 and 17.0 volts and the stabilizer circuit is arranged to provide an output of 10.0 volts across the terminals 23 and 24 to which a load (not shown) is arranged to be connected.

The Zener diode 28 is arranged with its direction of reverse conduction of current away from the earth line 25 and it therefore provides a steady reference potential which is used as a bias for the base electrode of the transistor 34. The base electrode of the transistor 33, on the other hand, is supplied with a variable bias supplied from the tapping point on the resistor 31, this bias varying in dependence upon the voltage between the terminals 23 and 24.

A control signal is therefore supplied from the collector electrode of the transistor 33 to the base electrode of the transistor 41 which, in turn, varies the bias supplied to the base electrode of the transistor 5. Thus, when the voltage between the terminals 23 and 24 varies, due to changes in the voltage between the terminals 21 and 22 or changes in the current taken by the load, the impedance of the series impedance element is varied in such a sense as to reduce the change in the voltage between the terminals 23 and 24.

During operation, the terminal 38 is maintained at a negative potential of 20 volts in order to obtain a reasonable gain from transistor 33. The purpose of resistor 26 is to ensure that, when necessary, the transistor 5 is fully bottomed.

In operation of the voltage stabilizer circuit the maximum power dissipated in the series impedance element is 36 watts. For the conditions for which the stabilizer circuit is designed the maximum power which can be dissipated in each of the transistors 5 and 8 is 9 watts and, with the arrangement described, this is not exceeded for either of the transistors 5 or 8 at any time.

In the voltage stabilizer circuit described the components are as follows:

| | |
|---|---|
| Resistor **7** | 1.35 ohms. |
| Resistor **26** | 0.1 ohm. |
| Resistor **27** | 820 ohms. |
| Resistor **31** | 250 ohms (variable tapping). |
| Resistor **32** | 270 ohms. |
| Resistor **35** | 270 ohms. |
| Resistor **36** | 820 ohms. |
| Resistor **37** | 470 ohms. |
| Resistor **42** | 2.2 kilohms. |
| Resistor **43** | 120 ohms. |
| Capacitor **29** | 0.25 microfarad. |
| Capacitor **40** | 50 microfarads. |
| Capacitor **42** | 0.25 microfarad. |

Transistors 5, 8 and 41: type GET 572 as supplied by The General Electric Company Limited.
Transistors 33 and 34: type GET 872 as supplied by The General Electric Company Limited.
Rectifier element 6: type SX 751, Zener diode 28: type SX 47, and Zener diode 39: type SX 82, all as supplied by The General Electric Company Limited.

The Zener diode 30 has a reverse breakdown voltage of 3.3 volts.

I claim:

1. A variable-impedance electric circuit comprising a first terminal, a second terminal, first and second transistors each having a control electrode and two further electrodes, a non-linear resistance element, a linear resistance, the first terminal being directly connected to one of said further electrodes of the first transistor the other further electrode of which is connected by way of said non-linear resistance element only to the second terminal, the first terminal also being connected by way of said linear resistance to one of said further electrodes of the second transistor the other further electrode of which is directly connected to the second terminal, a direct connection between the further electrode of the first transistor adjacent said non-linear resistance element and the control electrode of the second transistor, and a path connected to the control electrode of the first transistor over which a control bias may be supplied to said control electrode, the arrangement being such that the impedance of the circuit, measured between the first and second terminals, may be varied by varying the value of said control bias.

2. A variable-impedance electric circuit comprising an input terminal, an output terminal, first and second junction transistors each having base, collector and emitter electrodes, a first rectifier element, a resistance, the input terminal being directly connected by way of the collector-emitter path of the first transistor to one terminal of said rectifier element the other terminal of which is directly connected to the output terminal, the input terminal also being connected to one terminal of said resistance the other terminal of which is connected by way of the collector-emitter path of the second transistor only, to the output terminal, a direct connection between the electrode of the first transistor adjacent said rectifier element and the base electrode of the second transistor, and a path connected to the base electrode of the first transistor over which a control bias may be supplied to said base electrode, the arrangement being such that the impedance of the circuit, measured between the input and output terminals, may be varied by varying the value of said control bias.

3. A circuit in accordance with claim 2 wherein the value of said resistance is approximately equal to $4W/I^2$, where W is the maximum power which can be dissipated in the first transistor and I is the maximum current flowing between the input and output terminals.

4. A circuit in accordance with claim 3 wherein said rectifier element has a forward voltage drop sufficient to cause the second transistor to become bottomed at a value of current in the first transistor not greater than $I/4$.

5. A circuit in accordance with claim 2 wherein said resistance comprises a linear resistor and a second rectifier element, similar to the first rectifier element, connected in series.

6. A circuit in accordance with claim 2 wherein the first and second transistors are both mounted on a single heat sink, the maximum rate at which the sink can absorb heat from the transistors being approximately equal to the rate at which one of the transistors generates heat when the power being dissipated in that transistor is equal to W, where W is the maximum power which can be dissipated in either of the transistors.

7. A direct current voltage stabilizer circuit comprising a pair of first terminals across which a source of direct current is arranged to be connected, a pair of second terminals, a variable-impedance circuit in accordance with claim 2 having said input terminal connected to one of said first terminals and said output terminal connected to one of said second terminals, means to sense the value of the voltage appearing in operation between said second terminals and to supply said control bias over said path to the base electrode of the first transistor, said means controlling the value of said control bias in dependence upon the value of said voltage appearing between said second terminals such that said voltage appearing between said second terminals is stabilized at a required value.

8. A variable-impedance electric circuit comprising an input terminal, an output terminal, first and second thermionic valves each having an anode, a cathode and a control grid, first and second Zener diodes, a linear resistance, the input terminal being connected by way of only the anode-cathode path of the first valve to one terminal of the first Zener diode the other terminal of which is directly connected to the output terminal, the input terminal also being connected to one terminal of said linear resistance the other terminal of which is connected by way of the anode-cathode path of the second valve to one terminal of the second Zener diode the other terminal of which is connected to the output terminal, a direct connection between the terminal of the first Zener diode adjacent the first valve and the control grid of the second valve, and a path connected to the control grid of the first valve over which a control bias may be supplied to said control grid, the arrangement being such that the impedance of the circuit measured between the input and output terminals, may be varied by varying the value of said contorl bias.

References Cited in the file of this patent

UNITED STATES PATENTS

| | | |
|---|---|---|
| 2,906,941 | Brolin | Sept. 29, 1959 |
| 2,932,783 | Mohler | Apr. 12, 1960 |
| 2,959,726 | Jensen | Nov. 8, 1960 |
| 2,967,991 | Deuitch | Jan. 10, 1961 |
| 2,984,774 | Race | May 16, 1961 |
| 3,007,102 | Kennedy | Oct. 31, 1961 |
| 3,018,433 | Stone | Jan. 23, 1962 |
| 3,094,654 | Roelli | June 18, 1963 |